United States Patent
Komai et al.

(10) Patent No.: US 8,587,626 B2
(45) Date of Patent: Nov. 19, 2013

(54) LIGHT SOURCE CONTROL CIRCUIT, IMAGE FORMING APPARATUS, AND LIGHT SOURCE CONTROL METHOD

(75) Inventors: Kunihiro Komai, Osaka (JP); Izumi Kinoshita, Hyogo (JP); Tatsuya Miyadera, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 45 days.

(21) Appl. No.: 13/308,791

(22) Filed: Dec. 1, 2011

(65) Prior Publication Data

US 2012/0140013 A1   Jun. 7, 2012

(30) Foreign Application Priority Data

Dec. 3, 2010  (JP) ................. 2010-270552

(51) Int. Cl.
*B41J 2/435* (2006.01)
*B41J 2/47* (2006.01)
(52) U.S. Cl.
USPC ........... 347/229; 347/247; 347/248; 347/249; 347/250; 347/234; 347/235; 347/237
(58) Field of Classification Search
USPC .................. 347/229, 234–235, 237, 247–250
See application file for complete search history.

(56) References Cited

U.S. PATENT DOCUMENTS 6,118,463 A * 9/2000 Houki et al. ................. 347/116
7,679,634 B2 3/2010 Komai et al.
2007/0263270 A1 11/2007 Komai et al.
2012/0062681 A1 * 3/2012 Miyadera et al. ............ 347/116
2012/0062682 A1 * 3/2012 Komai et al. ................ 347/118

FOREIGN PATENT DOCUMENTS

JP   2008055717 A   3/2008
JP   2009234256 A   10/2009

OTHER PUBLICATIONS

Abstract of JP 2008-055717 published Mar. 13, 2008.
Abstract of JP 2009-234256 published Oct. 15, 2009.

* cited by examiner

*Primary Examiner* — Stephen Meier
*Assistant Examiner* — Sara Al Hashimi
(74) *Attorney, Agent, or Firm* — Harness, Dickey & Pierce, P.L.C.

(57) ABSTRACT

A light source control circuit of an optical writing device, admitting connection of light sources and forming an electrostatic latent image on a photosensitive element by controlling a connected light source, includes: a skew correction unit that corrects a skew of a main scanning line of an electrostatic latent image formed by the light source relative to the photosensitive element; a pattern generating unit that outputs image data for forming a predetermined pattern in an electrostatic latent image; a local deviation correction unit that corrects a local deviation of an electrostatic latent image formed by the light source on the main scanning line by acquiring image data processed to form the pattern and by performing a predetermined process; a light source control unit that causes the light source to emit light based on image data in which the local deviation has been corrected; and a setting value input unit.

9 Claims, 6 Drawing Sheets

FIG.11A

```
SKEW CORRECTION REGISTER VALUE
  SHIFT POSITION: XX, XX, XX, XX ···

PATTERN GENERATION REGISTER VALUE
  GENERATION PATTERN: SECURITY PATTERN

UNDULATION CORRECTION REGISTER VALUE
  NUMBER OF DIVISIONS: NULL
  SHIFT POSITION: NULL
  SHIFT AMOUNT: NULL

OUTPUT REGISTER VALUE
  LD CONTROL UNIT
        ···
```

FIG.11B

```
SKEW CORRECTION REGISTER VALUE
  SHIFT POSITION: XX, XX, XX, XX ···

PATTERN GENERATION REGISTER VALUE
  GENERATION PATTERN: SECURITY PATTERN

UNDULATION CORRECTION REGISTER VALUE
  NUMBER OF DIVISIONS: 4
  SHIFT POSITION: XX, XX, XX, XX ···
  SHIFT AMOUNT: XX, XX, XX, XX ···

OUTPUT REGISTER VALUE
  LEDA CONTROL UNIT
        ···
```

LIGHT SOURCE CONTROL CIRCUIT, IMAGE FORMING APPARATUS, AND LIGHT SOURCE CONTROL METHOD

CROSS-REFERENCE TO RELATED APPLICATIONS

The present application claims priority to and incorporates by reference the entire contents of Japanese Patent Application No. 2010-270552 filed in Japan on Dec. 3, 2010.

BACKGROUND OF THE INVENTION

1. Field of the Invention

The present invention relates to a light source control circuit, an image forming apparatus, and a light source control method, and in particular, to an optical writing control device capable of supporting different types of light sources.

2. Description of the Related Art

Recently, there has been a tendency for promoting conversion of information into an electronic form, and accordingly, an image processing apparatus, such as a printer and a facsimile machine used for outputting electronic information and a scanner used for converting a document into an electronic form, have become key devices. An image processing apparatus having an image capturing function, an image forming function, a communication function, and the like, is often used to form a multi function peripheral (MFP) which is usable as a printer, a facsimile, a scanner, and a copying machine.

Of these image processing apparatuses, electrophotographic image forming apparatuses are widely employed as image forming apparatuses used for outputting electronic documents. An electrophotographic image forming apparatus forms an electrostatic latent image by exposing a photosensitive element to light, and develops the electrostatic latent image to form a toner image using a developer such as toner, transfers the toner image onto a sheet, and discharges the sheet.

In the electrophotographic image forming apparatus, an optical writing device that exposes the photosensitive element to light may employ a laser diode (LD) light source or a light emitting diode (LED) light source. The LD light source includes a light source that emits a beam for exposing the photosensitive element, and a deflector, such as a polygon mirror, for deflecting the emitted beam to scan the entire surface of the photosensitive element in a main scanning direction. On the other hand, the LED light source includes an LED head in which chips of LED light sources are arranged across the surface of the photosensitive element in the main scanning direction.

For an optical writing device, however, designing a circuit of an optical writing control device needs a large cost when the device controls a light source based on information of an image to be formed and outputted. Because there is a difference in the light source that is to be controlled between the optical writing device with the LD light source and the optical writing device with the LED light source, it is necessary, in principle, to design an optical writing control device for each of the optical writing devices. However, because a large cost is required to design the circuit of the optical writing control device as described above, there is demand for an optical writing control device capable of supporting both the LD light source and the LED light source.

In the case of the LD light source, when the trajectory of the beam that has been caused to scan the photosensitive element by the polygon mirror has a deviation from the main scanning direction of the photosensitive element, it is necessary to perform a skew correction process that corrects the skew of an image to be formed. As for the LED light source, when the LED head is skewed with respect to the photosensitive element, a skew correction process to correct the skew and an undulation correction process to correct an assembly error (hereinafter, referred to as "undulation") of the LED chips assembled in the LED head need to be performed, respectively (for example, Japanese Patent Application Laid-open No. 2008-55717).

Generally, in the skew correction process described above, a skew is corrected by dividing pixels in the main scanning direction into a plurality of blocks and shifting, in units of blocks, a line memory, from which pixel data are read in the sub-scanning direction when the pixel data stored in the line memory are read out and input to the light source device. On the other hand, when the LED light source is used, undulation correction is performed by dividing pixels in the main scanning direction into a plurality of blocks, corresponding to each of the LED chips described above, and then shifting the line memory, from which pixel data are read, in the sub-scanning direction in each of the blocks according to an assembly error correction value of the LED chips when the pixel data stored in the line memory are read and input to the light source device.

In the case of the LD light source, the shift amount of a pixel in the sub-scanning direction in the skew correction process is determined in units of a line. In the case of the LED light source, because it is not necessary to scan the beam in the main scanning direction, it is easy to increase a light emission frequency in the sub-scanning direction, that is, it is easy to increase the resolution in the sub-scanning direction. In addition, the shift amount of the pixel in the sub-scanning direction in the skew correction process and the undulation correction process can be reduced to one pixel or less such as a half of a pixel or a quarter of a pixel.

Meanwhile, some of the optical writing devices include a pattern generating unit that generates various patterns such as a MUSIC pattern for color correction, a process control pattern for process control, and a forgery prevention pattern for forgery prevention. As described above, when the skew correction process or the undulation correction process is performed after the pattern generation, if an image is shifted by one line as is performed with the LD light source, a pattern at the boundary between the blocks collapses, causing a trouble in a subsequent pattern reading process.

In this regard, when the LD light source is used, it is desirable to perform the pattern generating process after the skew correction process is performed. In this case, the generated pattern is not subjected to the skew correction process; however, because local pixels are not shifted even when an image is skewed, the pattern remains to be recognizable over the whole image.

In the LED light source, the undulation occurs due to the assembly error of the LED chips in the LED head as described above. Thus, when a pattern is generated after the undulation correction is performed, because the generated pattern has not been subjected to the undulation correction, the pattern locally collapses due to the assembly error of the LED chips. Therefore, it is desirable to perform the undulation correction after the pattern generation when the LED light source is used.

As described above, the difference in the light source between the LD light source and the LED light source causes a difference in the position to arrange a circuit for implementing a correction process (hereinafter, referred to as a "correcting circuit") relative to a circuit for implementing pattern generation (hereinafter, referred to as a "pattern generating circuit"). That is, when the LD light source is used, it is desirable to provide the correcting circuit ahead of the pattern generating circuit, and when the LED light source is used, it is desirable to provide the correcting circuit following the pattern generating circuit.

That is, in order to construct the optical writing control device supporting both the LD light source and the LED light source, it is necessary to provide the correcting circuit for the LD light source ahead of the pattern generating circuit and to provide the correcting circuit for the LED light source behind the pattern generating circuit. Consequently, a line memory is provided in each of the correcting circuits. However, when the LD light source is connected, the correcting circuit for the LED light source is not used, and when the LED light source is connected, the correcting circuit for the LD light source is not used.

The line memory is necessary in operating the respective correcting circuits. However, the capacity of the line memory considerably affects the cost for manufacturing the optical writing control device. Thus, it is very inefficient in terms of the manufacturing cost to provide the line memory for each of the cases with the LD light source and the LED light source separately despite that the skew correction process is common to both cases.

SUMMARY OF THE INVENTION

It is an object of the present invention to at least partially solve the problems in the conventional technology.

A light source control circuit of an optical writing device admits connection of any one of a plurality of different types of light sources and forms an electrostatic latent image on a photosensitive element by a connected light source controlled by the light source control circuit. The light source control circuit includes: a skew correction unit that corrects a skew of a main scanning line of an electrostatic latent image formed by the light source relative to the photosensitive element by acquiring image data of an image to be formed as the electrostatic latent image and by performing a predetermined process; a pattern generating unit that outputs image data for forming a predetermined pattern in an electrostatic latent image to be formed by acquiring image data in which the skew has been corrected and by performing a predetermined process; a local deviation correction unit that corrects a local deviation of an electrostatic latent image formed by the light source on the main scanning line by acquiring image data processed to form the pattern and by performing a predetermined process; a light source control unit that causes the light source to emit light based on image data in which the local deviation has been corrected; and a setting value input unit that inputs setting values which are referred to in an operation of each of the above units. The skew correction unit corrects the skew between the light source and the photosensitive element by storing pixel data that includes information of each of pixels configuring the image data in a first line memory for each main scanning line, and by reading, at a position on the main scanning line corresponding to an input setting value, the pixel data after shifting a main scanning line stored in the first line memory in a sub-scanning direction, the pattern generating unit outputs image data for forming a predetermined pattern in the electrostatic latent image by converting pixel data corresponding to an input setting value among the pixel data read from the first line memory and by outputting the converted image data, and the local deviation correction unit corrects the local deviation by storing the pixel data converted and output for forming the predetermined pattern in a second line memory for each main scanning line, dividing the main scanning line and increasing a resolution in the sub-scanning direction by successively reading the pixel data from each main scanning line in the second line memory a number of times corresponding to an input setting value, shifting the main scanning line for reading the pixel data in the sub-scanning direction at a position, on the main scanning line, corresponding to a setting value input according to the connected light source, and reading the pixel data.

An image forming apparatus includes: an optical writing device controlled by the light source control circuit mentioned above.

A light source control method for controlling a light source in an optical writing device admits connection of any one of a plurality of different types of light sources and forms an electrostatic latent image on a photosensitive element by a connected light source. The light source control method includes: correcting a skew between the light source and the photosensitive element by storing pixel data that includes information of each of pixels configuring image data of an image to be formed as the electrostatic latent image in a first line memory for each main scanning line, shifting a main scanning line of the first line memory in a sub-scanning direction at a position, on the main scanning line, corresponding to an input setting value, and reading the pixel data; outputting image data for forming a predetermined pattern in the electrostatic latent image by converting pixel data associated with an input setting value among the pixel data read from the first line memory and outputting the converted image data; correcting a local deviation by storing the pixel data converted and output for forming the predetermined pattern in a second line memory for each main scanning line, dividing the main scanning line and increasing a resolution multiple times in the sub-scanning direction by successively reading the pixel data from each main scanning line in the second line memory by a number of times according to an input setting value, shifting the main scanning line for reading the pixel data in the sub-scanning direction at a position, on the main scanning line, corresponding to a setting value input according to the connected light source, and reading the pixel data; and causing the light source to emit light based on the pixel data read from the second line memory.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 11A and 11B are diagrams illustrating examples of a register value according to the embodiment.

DETAILED DESCRIPTION OF THE PREFERRED EMBODIMENTS

First Embodiment

A first embodiment of the present invention will be described in detail below with reference to the accompanying drawings. In the present embodiment, a multi function peripheral (MFP) will be described as an example of an image forming apparatus. The image forming apparatus according to the present embodiment is an electrophotographic MFP, and the gist of the present embodiment is that an optical writing control unit that controls a light source in an optical writing device for forming an electrostatic latent image on a photosensitive element supports both a laser diode (LD) light source and a light emitting diode (LED) light source. The image forming apparatus is not limited to the MFP and may be, for example, a copying machine, a printer, or a facsimile machine.

Figure 1:
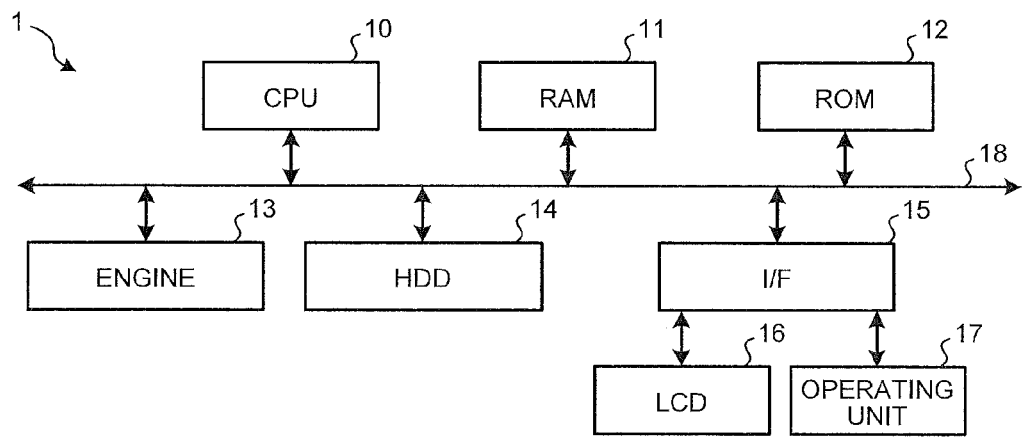
FIG. 1 is a block diagram illustrating a hardware configuration of an image forming apparatus according to an embodiment.

FIG. 1 is a block diagram illustrating a hardware configuration of an image forming apparatus 1 according to the present embodiment. As illustrated in FIG. 1, the image forming apparatus 1 according to the present embodiment includes an engine that performs image formation in addition to a configuration similar to a configuration of a commonly-used server or an information processing terminal such as a personal computer (PC). Specifically, in the image forming apparatus 1 according to the present embodiment, a central processing unit (CPU) 10, a random access memory (RAM) 11, a read only memory (ROM) 12, an engine 13, a hard disk drive (HDD) 14, and an interface (I/F) 15 are connected to one another via a bus 18. In addition, a liquid crystal display (LCD) 16 and an operating unit 17 are connected to the I/F 15.

The CPU 10 is a calculation unit and controls the overall operation of the image forming apparatus 1. The RAM 11 is a volatile storage medium capable of performing high-speed reading and writing on information, and is used as a work area when the CPU 10 processes information. The ROM 12 is a read-only non-volatile storage medium, and stores therein a computer program such as firmware. The engine 13 is a mechanism that actually performs the image formation in the image forming apparatus 1.

The HDD 14 is a non-volatile storage medium capable of reading and writing information and stores therein an operating system (OS), various kinds of control programs, application programs, and the like. The I/F 15 connects and controls the bus 18 and various kinds of hardware, a network, and the like. The LCD 16 is a visual user interface that allows a user to check the status of the image forming apparatus 1. The operating unit 17 is a user interface, such as a keyboard or a mouse, which allows the user to input information to the image forming apparatus 1.

In this hardware configuration, a software control unit is configured by reading a computer program stored in the ROM 12, the HDD 14, or a storage medium such as an optical disk (not shown) to the RAM 11 and performing a calculation according to the computer program by the CPU 10. A functional block for implementing functions of the image forming apparatus 1 according to the present embodiment is configured by a combination of the software control unit configured in this manner and the hardware.

Figure 2:
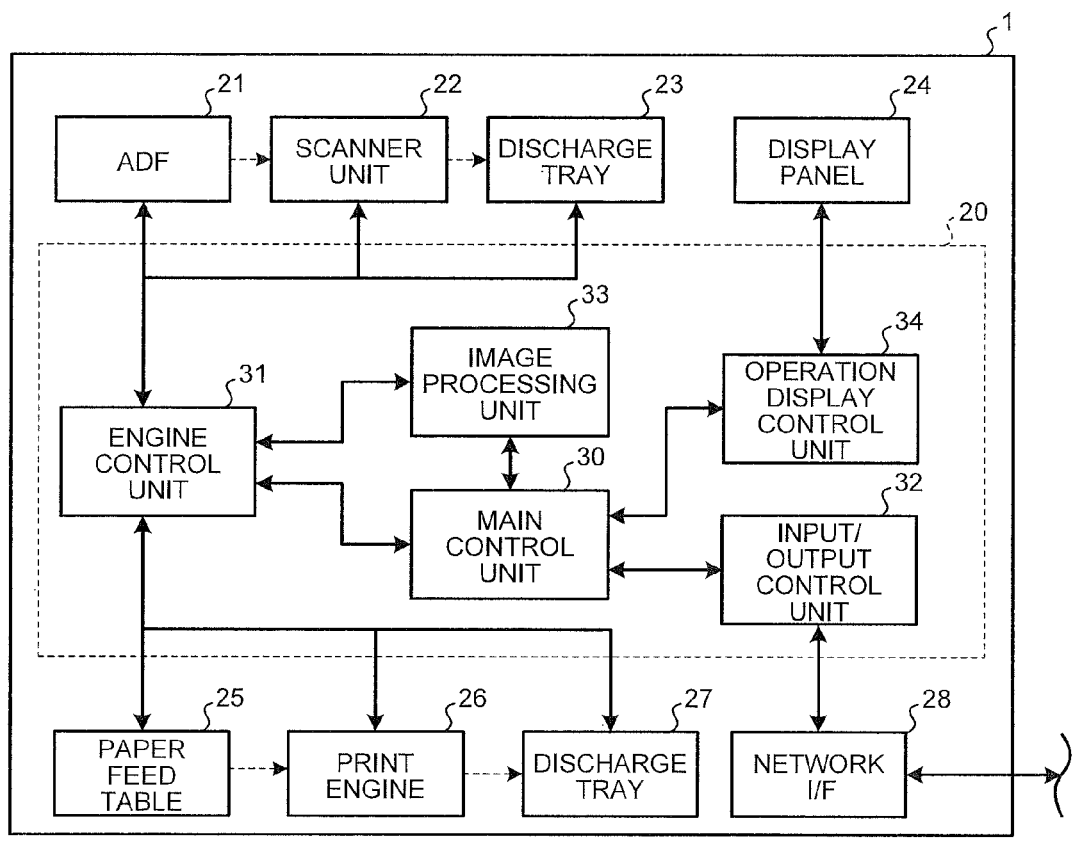
FIG. 2 is a diagram illustrating a functional configuration of the image forming apparatus according to the embodiment.

Next, a functional configuration of the image forming apparatus 1 according to the present embodiment will be described with reference to FIG. 2. FIG. 2 is a block diagram illustrating a functional configuration of the image forming apparatus 1 according to the present embodiment. As illustrated in FIG. 2, the image forming apparatus 1 according to the present embodiment includes a controller 20, an automatic document feeder (ADF) 21, a scanner unit 22, a discharge tray 23, a display panel 24, a paper feed table 25, a print engine 26, a discharge tray 27, and a network I/F 28.

The controller 20 includes a main control unit 30, an engine control unit 31, an input/output control unit 32, an image processing unit 33, and an operation display control unit 34. As illustrated in FIG. 2, the image forming apparatus 1 according to the present embodiment is configured as an MFP including the scanner unit 22 and the print engine 26. In FIG. 2, electrical connections are indicated by solid arrows, and the flow of a sheet is indicated by dashed arrows.

The display panel 24 is an output interface that visually displays the status of the image forming apparatus 1 and also an input interface (an operating unit), implemented as a touch panel that allows the user to directly operate the image forming apparatus 1 or input information to the image forming apparatus 1. The network I/F 28 is an interface that enables the image forming apparatus 1 to communicate with other apparatuses via the network, and the Ethernet (a registered trademark) interface or a universal serial bus (USB) interface is used as the network I/F 28.

The controller 20 is configured with a combination of software and hardware. Specifically, a control program, such as firmware, stored in the ROM 12, a nonvolatile memory, the HDD 14, or a non-volatile recording medium such as an optical disk is loaded into a volatile memory (hereinafter, referred to as a "memory") such as the RAM 11. The controller 20 is configured with the software control unit implemented according to the control of the CPU 10 and hardware such as an integrated circuit (IC). The controller 20 functions as a control unit that controls the entire image forming apparatus 1.

The main control unit 30 serves to control each unit included in the controller 20, and gives an instruction to each unit of the controller 20. The engine control unit 31 serves as a drive unit that controls or drives the print engine 26, the scanner unit 22, and the like. The input/output control unit 32 inputs a signal or an instruction via the network I/F 28 to the main control unit 30. The main control unit 30 controls the input/output control unit 32 and accesses other apparatuses via the network I/F 28.

The image processing unit 33 generates drawing information based on print information included in an input print job according to the control by the main control unit 30. The drawing information refers to information for drawing an image to be formed by the print engine 26 serving an image forming unit during an image forming operation. The print information included in the print job refers to image information which is converted into a format recognizable by the image forming apparatus 1 by a printer driver installed in an information processing apparatus, such as a PC. The operation display control unit 34 displays information on the display panel 24 or notifies the main control unit 30 of information input via the display panel 24.

When the image forming apparatus 1 operates as a printer, first, the input/output control unit 32 receives a print job via the network I/F 28. The input/output control unit 32 forwards the received print job to the main control unit 30. Upon receiving the print job, the main control unit 30 controls the image processing unit 33 and causes the image processing unit 33 to generate drawing information based on print information included in the print job.

When the drawing information is generated by the image processing unit 33, the engine control unit 31 forms an image on the sheet conveyed from the paper feed table 25 based on the generated drawing information. That is, the print engine 26 serves as an image forming unit. The sheet on which the image is formed by the print engine 26 is discharged to the discharge tray 27.

When the image forming apparatus 1 operates as a copying machine, the image processing unit 33 generates drawing information based on imaging information received by the engine control unit 31 from the scanner unit 22 or image information generated by the image processing unit 33 based on the imaging information. Similarly to the printer operation, the engine control unit 31 drives the print engine 26 based on the drawing information.

Figure 3:
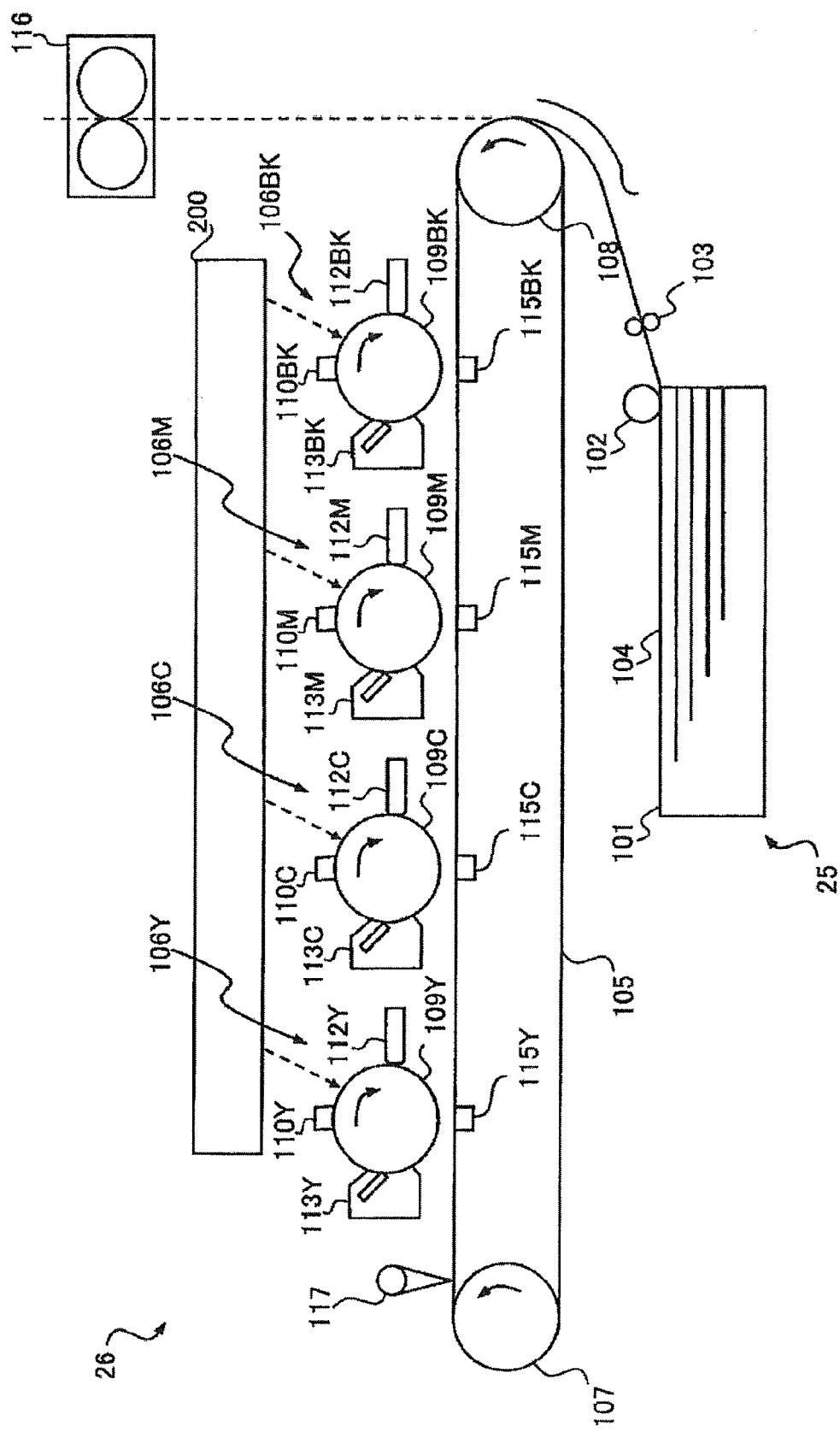
FIG. 3 is a diagram illustrating a configuration of a printer engine according to the embodiment.

Next, a configuration of the print engine 26 according to the present embodiment will be described with reference to FIG. 3. As illustrated in FIG. 3, the print engine 26 according to the present embodiment is so-called a tandem type, having a configuration in which image forming units of respective colors are arranged along a conveying belt 105 that is an endless moving unit. That is, a plurality of image forming units (electrophotographic process units) 106BK, 106M, 106C, and 106Y are arranged, in this order from the upstream side in a conveying direction of the conveying belt 105, along the conveying belt 105 which is an intermediate transfer belt on which an intermediate transfer image is formed to be transferred onto a sheet (an example of a recording medium) 104 separated and fed from a paper feed tray 101 by a paper feeding roller 102 and a separating roller 103.

The plurality of image forming units 106BK, 106M, 106C, and 106Y differ from one another only in colors of toner images to form and have a common internal configuration. The image forming unit 106BK forms a black image, the image forming unit 106M forms a magenta image, the image forming unit 106C forms a cyan image, and the image forming unit 106Y forms a yellow image. In the following description, the image forming unit 106BK will be described specifically, and because the other image forming units 106M, 106C, and 106Y have the same elements as those of the image forming unit 106BK, the elements of the image forming units 106M, 106C, and 106Y are denoted by reference numerals distinguished by "M", "C", or "Y", respectively, in the drawing in place of "BK" on the labeled elements of the image forming unit 106BK. Thus, the redundant description will not be repeated.

The conveying belt 105 is an endless belt suspended by a driving roller 107, which is rotatably driven, and a driven roller 108. The driving roller 107 is rotatably driven by a driving motor (not shown). The driving motor, the driving roller 107, and the driven roller 108 function as a driving unit that moves the conveying belt 105 which is the endless moving unit.

In image formation, the first image forming unit 106BK transfers a black toner image to the conveying belt 105 that is rotatably driven. The image forming unit 106BK includes a photosensitive element 109BK as a photosensitive body, and a charging unit 110BK, an optical writing device 200, a developing unit 112BK, a photosensitive element cleaner (not shown), an neutralization unit 113BK, and the like, which are arranged around the photosensitive element 109BK. The optical writing device 200 is configured to irradiate the respective photosensitive elements 109BK, 109M, 109C, and 109Y (hereinafter, collectively referred to as a "photosensitive element 109") with light.

In image formation, the outer circumferential surface of the photosensitive element 109BK is uniformly charged by the charging unit 110BK in the dark, then writing on the photosensitive element 109BK is performed by light from a light source corresponding to a black image from the optical writing device 200, and an electrostatic latent image is formed on the photosensitive element 109BK. The developing unit 112BK develops the electrostatic latent image into a visible image using black toner, whereby a black toner image is formed on the photosensitive element 109BK.

The toner image is transferred onto the conveying belt 105 at the position where the photosensitive element 109BK and the conveying belt 105 come into contact with each other or become closest to each other (the transfer position) by an action of a transfer unit 115BK. By this transfer, an image made of black toner is formed on the conveying belt 105. Unnecessary toner remaining on the outer circumferential surface of the photosensitive element 109BK that has been subjected to the transfer of the toner image is removed by the photosensitive element cleaner, the outer circumferential surface of the photosensitive element 109BK is neutralized by the neutralization unit 113BK, and the photosensitive element 109BK keeps on standby for the next image formation.

The black toner image that has been transferred onto the conveying belt 105 by the image forming unit 106BK in the above described way is conveyed to the next image forming unit 106M by roller driving of the conveying belt 105. In the image forming unit 106M, by the same process as the image forming process performed in the image forming unit 106BK, a magenta toner image is formed on the photosensitive element 109M, and the toner image is transferred onto the previously formed black image in a superimposed manner.

The toner images of black toner and magenta toner transferred onto the conveying belt 105 are conveyed to the subsequent image forming units 106C and 106Y. By the similar operations, a cyan toner image formed on the photosensitive element 109C and a yellow toner image formed on the photosensitive element 109Y are transferred onto the previously transferred image in the superimposed manner. Thus, a full-color intermediate transfer image is formed on the conveying belt 105.

The sheets 104 stored in the paper feed tray 101 are fed out sequentially starting from a sheet on top, and the intermediate transfer image formed on the conveying belt 105 is transferred onto the sheet 104 at the position where the feed path comes into contact with or becomes closest to the conveying belt 105. As a result, the image is formed on the sheet 104. The sheet 104 on which the image is formed is further conveyed, the image has been fixed by a fixing unit 116, and the sheet 104 is discharged to the outside of the image forming apparatus 1.

In the image forming apparatus 1, due to an error in the inter-shaft distance between the photosensitive elements 109BK, 109M, 109C, and 109Y, an error in parallelism of the photosensitive elements 109BK, 109M, 109C, and 109Y, an assembly error of the deflecting mirror in the optical writing device 200, an error in timing of writing the electrostatic latent image on the photosensitive elements 109BK, 109M, 109C, and 109Y, or the like, the toner images of respective colors are not superimposed on each other at the position where they should be superimposed on each other, causing a positional deviation in respective colors.

Further, due to a similar cause, the image may be transferred onto a sheet, serving as a transfer target, in a range which has strayed from the range in which the image should have been transferred. Known elements of the positional deviation are such as a skew, misregistration in the sub-scanning direction, a magnification ratio error in the main scanning direction, and misregistration in the main scanning direction. In addition, known errors are found in the rotation speed of the conveying roller for conveying the sheet, an error in a conveyance amount caused by abrasion of the conveying roller, and the like.

A pattern detecting sensor 117 is provided so as to correct the positional deviation. The pattern detecting sensor 117 is an optical sensor for reading a positional deviation correction pattern transferred onto the conveying belt 105 by the photosensitive elements 109BK, 109M, 109C, and 109Y. The pattern detecting sensor 117 includes an optical element for emitting light to a correction pattern drawn on the surface of the conveying belt 105 and an optical element for receiving light reflected from the correction pattern. As illustrated in FIG. 3, the pattern detecting sensor 117 is supported on the same substrate in a downward direction perpendicular to the conveying direction of the conveying belt 105 on the downstream side of the photosensitive elements 109BK, 109M, 109C, and 109Y.

Next, a description will be given of the optical writing device 200 according to the present embodiment. As described above, the LD light source or the LED light source may be selectively employed as the optical writing device 200 according to the present embodiment. First, a description will be given of the LD light source.

Figure 4:
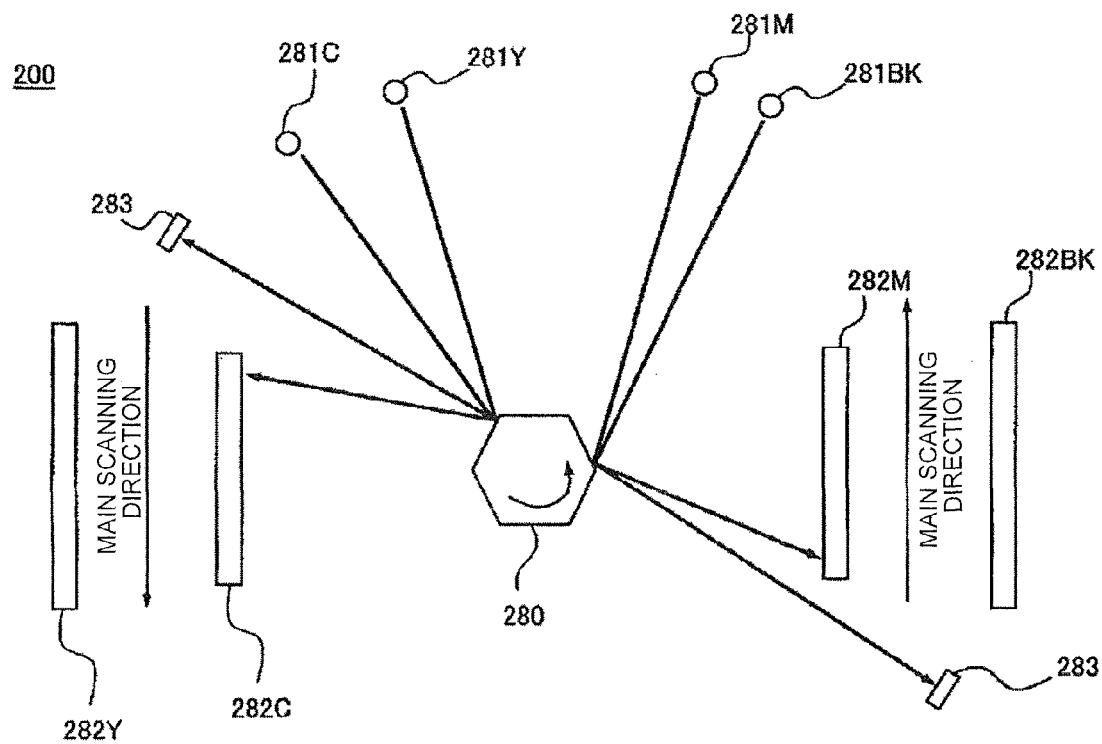
FIG. 4 is a top view illustrating a configuration of an optical writing device according to the embodiment.
Figure 5:
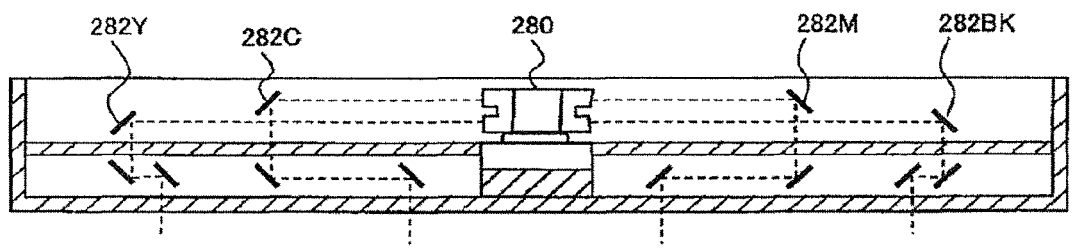
FIG. 5 is a cross-sectional side view illustrating a configuration of the optical writing device according to the embodiment.

FIG. 4 is a top view of the optical writing device 200 according to the present embodiment. FIG. 5 is a cross-sectional side view of the optical writing device 200 according to the present embodiment. As illustrated in FIGS. 4 and 5, laser beams for performing writing on the photosensitive elements 109BK, 109M, 109C, and 109Y of respective colors are emitted from LD light source devices 281BK, 281M, 281C, and 281Y (hereinafter, collectively referred to as a "LD light source device 281") which are the LD light sources. The LD light source device 281 according to the present embodiment includes a semiconductor laser, a collimator lens, a slit, a prism, a cylinder lens, and the like.

The laser beams emitted from the LD light source device 281 are reflected by a reflecting mirror 280. The laser beams are guided to mirrors 282BK, 282M, 282C, and 282Y (hereinafter, collectively referred to as a "mirror 282") by an optical system such as an fθ lens (not shown), respectively, and then the surfaces of the photosensitive elements 109BK, 109M, 109C, and 109Y are scanned with the laser beams by the optical systems provided in a subsequent portion. That is, the reflecting mirror 280 and the mirror 282 function as a scanning unit.

The reflecting mirror 280 includes a hexahedral polygon mirror. The reflecting mirror 280 can perform scanning with a laser beam corresponding to one line in the main scanning direction by respective surfaces of the polygon mirror through rotation. A horizontal synchronization detecting sensor 283 is provided near a scanning start position of a range scanned with the laser beam by the reflecting mirror 280. When the laser beam from the LD light source device 281 is incident on the horizontal synchronization detecting sensor 283, timing of the scanning start position of a main scanning line is detected, and a control device for controlling the LD light source device 281 is synchronized with the reflecting mirror 280.

Figure 6:
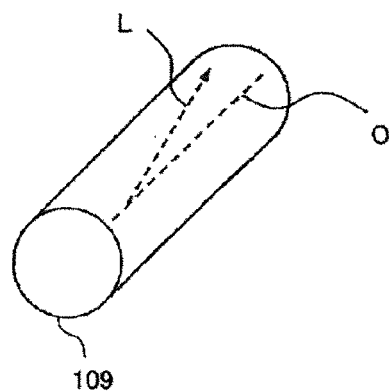
FIG. 6 is a diagram illustrating a skew of a main scanning line in the optical writing device according to the embodiment.

FIG. 6 is a diagram illustrating the skew of a main scanning line occurring in the optical writing device 200 of the LD light source illustrated in FIGS. 4 and 5. In order to form an image without a skew, the trajectory of a beam emitted from a light source needs to be parallel to the rotating shaft of the photosensitive element indicated by "O" in FIG. 6. However, due to an assembly error of the polygon mirror, an assembly error of the LD light source device 281, or an irregular rotation of the photosensitive element 109, or a variation in a surface diameter of the photosensitive element 109, the beam trajectory may be skewed as indicated by L in FIG. 6. A process of correcting the skew of the beam trajectory is referred to as a skew correction process in the optical writing device 200 using the LD light source.

Figure 7:
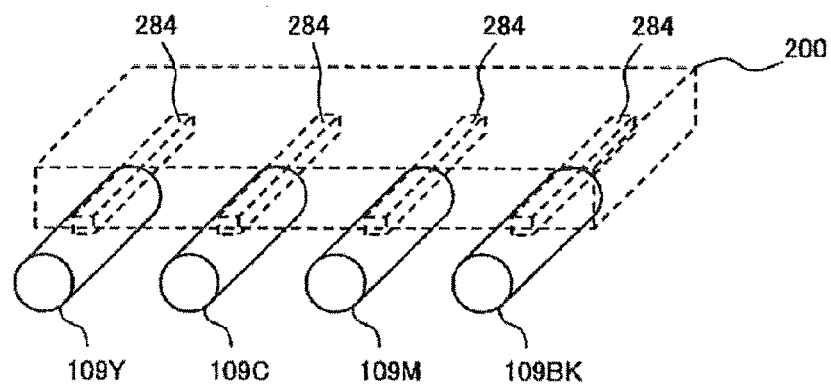
FIG. 7 is a perspective view illustrating a configuration of the optical writing device according to the embodiment.

Next, a description will be given of the optical writing device 200 using the LED light source. FIG. 7 is a diagram illustrating an arrangement relation between the optical writing device 200 including the LED light source and the photosensitive element 109 according to the present embodiment. As illustrated in FIG. 7, light for irradiating the photosensitive elements 109BK, 109M, 109C, and 109Y of respective colors is emitted from an array of LEDs (LEDA) 284BK, 284M, 284C, and 284Y (hereinafter, collectively referred to as an "LEDA 284"), which are light sources.

The LEDA 284 is configured such that LEDs as light emitting elements are arranged in the main scanning direction of the photosensitive element 109. An optical writing control device included in the optical writing device 200 controls the on/off status of each of the LEDs arranged in the main scanning direction based on data of an image to output, for each of main scanning lines, and selectively exposes the surface of the photosensitive element 109 to light to thereby form an electrostatic latent image. That is, the LEDA 284 forms an electrostatic latent image corresponding to one line of an image to output in the main scanning direction by performing one cycle of the on/off control.

Figure 8:
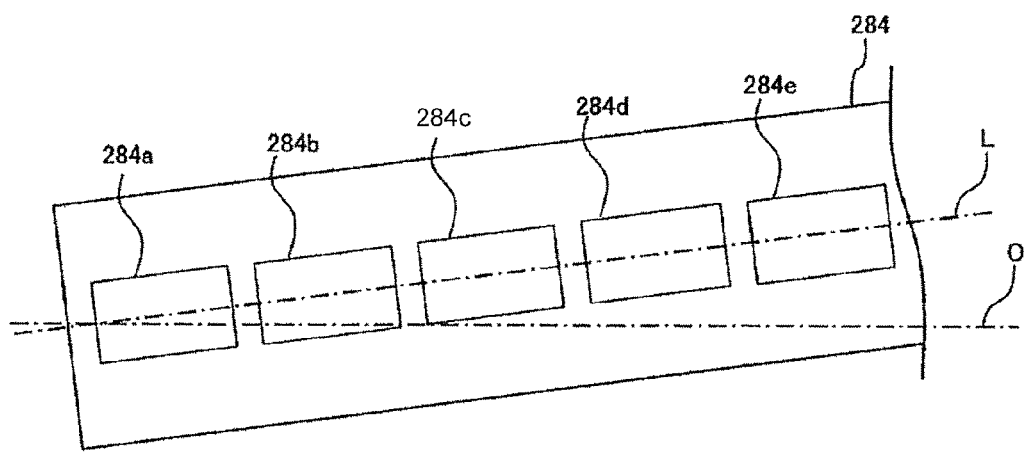
FIG. 8 is a diagram illustrating a skew of a main scanning line in the optical writing device according to the embodiment.

Next, a description will be made in connection with correction necessary in the optical writing device 200 employing the LED light source. FIG. 8 is a diagram illustrating the skew of the LEDA 284. As illustrated in FIG. 8, the LEDA 284 includes a plurality of light source chips 284a, 284b, 284c, 284d, 284e, and the like mounted on a substrate. The substrate is a supporting board for supporting the plurality of light source chips 284a, 284b, 284c, and the like. The plurality of light source chips 284a, 284b, 284c, and the like are mounted on the substrate that is further mounted on the optical writing device 200. The main scanning direction is the direction along which the plurality of light source chips 284a, 284b, 284c, and the like are arranged.

The plurality of light source chips 284a, 284b, 284c, and the like are integrated semiconductor chips, each of which includes a plurality of LED elements or light emitting elements as light sources. That is, the plurality of light source chips 284a, 284b, 284c, and the like are a light emitting element assembly. The plurality of LED elements installed in each of the plurality of light source chips 284a, 284b, 284c, and the like are also arranged in the main scanning direction. Each of the light source chips 284a, 284b, 284c, and the like according to the present embodiment includes 192 LED elements, that is, LED elements corresponding to 192 dots in the main scanning direction. The LEDA 284 according to the present embodiment includes 26 light source chips 284a, 284b, 284c, and the like arranged in the main scanning direction. The resolution of the LEDA 284 according to the present embodiment is 600 dots per inch (dpi).

As illustrated in FIG. 8, in the optical writing device 200 employing the LEDA 284, an assembly error of the LEDA 284 causes a so-called skew in which a skewed image is generated. In the example of FIG. 8, a direction parallel to the rotating shaft of the photosensitive element 109 is indicated by a dashed-dotted line "O", but the LEDA 284 is arranged to be skewed as indicated by a dashed-dotted line "L".

Because the electrostatic latent image is formed such that the photosensitive element 109 is exposed to light from the LEDA 284, when a direction in which the LEDs are arranged in the LEDA 284 is skewed with respect to the main scanning direction of the photosensitive element 109, the electrostatic latent image is also skewed corresponding to the amount of the skew. Then, the electrostatic latent image is developed into a skewed image. A correction process performed to prevent the occurrence of the skew is a skew correction process in the optical writing device 200 including the LEDA 284.

Figure 9:
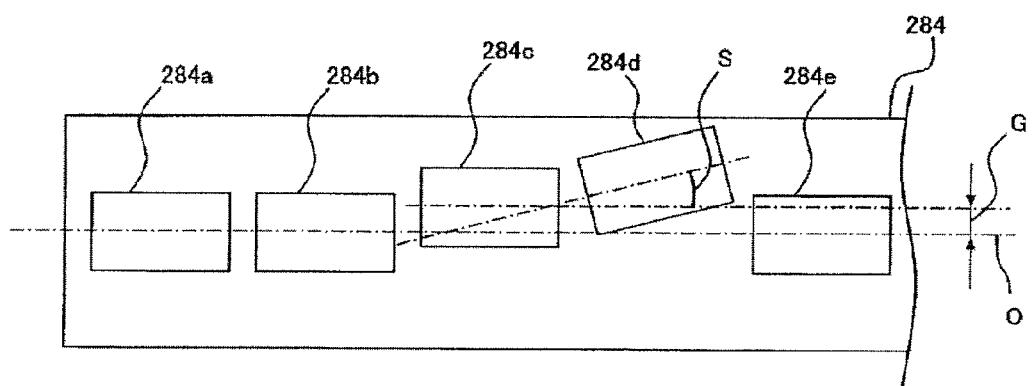
FIG. 9 is a diagram illustrating a chip error in an LEDA of the optical writing device according to the embodiment.

Next, the LEDA 284 which has a positional deviation among the light source chips 284a, 284b, 284c, and the like is illustrated in FIG. 9. In the example of FIG. 9, the light source chips 284a, 284b, and 284e are mounted in an ideal state. However, the light source chip 284c is shifted from the ideal state by a width G, and the light source chip 284d is further shifted from the ideal state and skewed by an angle S. Manufacturing tolerance illustrated in FIG. 9 may occur in the process of manufacturing the LEDA 284.

When image formation output is performed without considering the chip assembly error illustrated in FIG. 9, an image formed according to the chip assembly error is deviated, and image disturbance, such as a vertical stripe, that is, a stripe in the sub-scanning direction, appears in an output image. Hereinafter, such an image disturbance is referred to as an "undulation". In order to avoid the undulation, a process of correcting the assembly error based on information representing the chip assembly error illustrated in FIG. 9 and then executing an image formation output is referred to as an undulation correction process in the optical writing device 200 including the LEDA 284.

In the image forming apparatus 1 including the optical writing device 200, the gist of the present embodiment lies in that the optical writing control device is configured to be capable of performing appropriate image formation output even when any one of the LD light source and the LED light source is connected. The optical writing control device according to the present embodiment will be described below.

Figure 10:
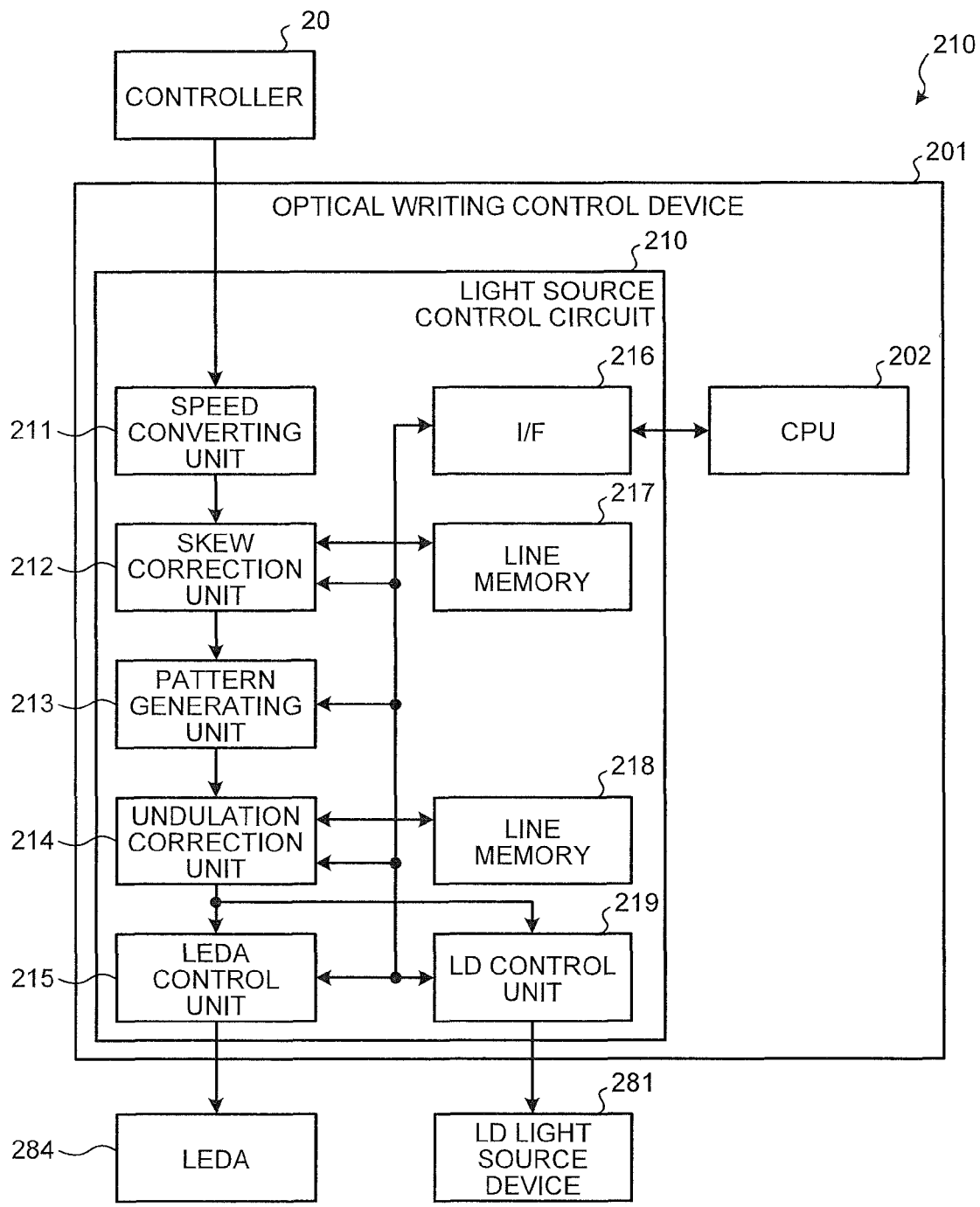
FIG. 10 is a block diagram illustrating a configuration of an optical writing control device according to the embodiment.

FIG. 10 is a block diagram illustrating a configuration of an optical writing control device 201 according to the present embodiment and a connection relation of the optical writing control device 201 with the controller 20, the LEDA 284, and the LD light source device 281 that is an LD light source. As illustrated in FIG. 10, the optical writing control device 201 according to the present embodiment includes a CPU 202 that functions as a control unit and a light source control circuit 210 that performs actual signal processing. Here, elements, such as the RAM 11, the ROM 12, or the like which have been described with reference to FIG. 1, may be appropriately included in the optical writing control device 201 for an operation of the CPU 202.

As illustrated in FIG. 10, the light source control circuit 210 includes a speed converting unit 211, a skew correction unit 212, a pattern generating unit 213, an undulation correction unit 214, an LEDA control unit 215, an I/F 216, line memories 217 and 218, and an LD control unit 219.

The speed converting unit 211 performs frequency conversion on image data, that is for an image formation output, input from the engine control unit 31 of the controller 20, and inputs a frequency conversion result to the skew correction unit 212 as pixel data. The skew correction unit 212 stores the pixel data input from the speed converting unit 211 in the line memory 217, reads the pixel data stored in the line memory 217, and inputs the pixel data to the pattern generating unit 213. The skew correction unit 212 performs a skew correction by shifting a line memory from which pixel data is read in the sub-scanning direction at each position, in the main scanning direction, determined by a register value input from the CPU 202 via the I/F 216 when the pixel data is read from the line memory 217. Here, the I/F 216 functions as a setting value input unit.

The register value input to the skew correction unit 212 is a value for correcting a skew of a light source in the main scanning direction, which has been described with reference to FIGS. 6 and 8. For example, when the deviation corresponding to 5 pixels in the sub-scanning direction occurs between one end and the other end of the photosensitive element 109 in the main scanning direction due to the skew of the light source in the main scanning direction, five shift positions are set, as the register value, at equal intervals across the whole area in the main scanning direction. Then, the deviation corresponding to five pixels is corrected.

A skew correction register value set in the above described way is not a predetermined value but a value calculated based on a read result obtained by reading a skew correction pattern, which is formed on, for example, the photosensitive element 109BK among a plurality of photosensitive elements 109, through the pattern detecting sensor 117.

The pattern generating unit 213 converts the color of a pixel associated with a pattern to output to the color corresponding to the pattern when image formation output is performed on a MUSIC pattern for color correction, a process control pattern for process control, a forgery-prevention pattern for forgery prevention, or the like.

In the case of the forgery prevention pattern, the conversion of the pixel is performed by superimposing a conversion output on an original image which is to be subjected to image formation output. However, in the case of the MUSIC pattern or the process control pattern, there is no original image to output. Even in this case, because the skew correction is necessary, the skew correction unit 212 performs the skew correction on a null pixel based on the register value and inputs a correction result to the pattern generating unit 213. Thus, the pattern generating unit 213 performs the conversion of the image so that the MUSIC pattern or the process control pattern can be formed on the null pixel.

The undulation correction unit 214 stores the pixel data input from the pattern generating unit 213 in the line memory 218, reads the pixel data stored in the line memory 218, and inputs the pixel data to the LEDA control unit 215 and the LD control unit 219. The undulation correction unit 214 functions as a local deviation correction unit that performs the undulation correction to correct the local deviation of an image on the main scanning line by shifting the line memory from which the pixel data is read in the sub-scanning direction at each position, in the main scanning direction, determined by the register value supplied from the CPU 202 via the I/F 216 when the pixel data is read from the line memory 218.

When the LEDA 284 is connected to the optical writing control device 201 according to the present embodiment, the undulation correction unit 214 multiplies the frequency in the sub-scanning direction by N, where N is an integer, and read the pixel data stored in one line of the line memory 218 for N times, thereby to increase the resolution in the sub-scanning direction by N times. That is, one main scanning line is divided into N pieces, and then, optical writing is performed in the LEDA 284. Thus, the undulation correction unit 214 can shift the main scanning line by one N-th (1/N) of a line.

As described above with reference to FIG. 9, the undulation refers to a local collapse of an image on the main scanning line, which occurs due to the assembly error of the light source chips in the LEDA 284. In addition, the deviation with the amount of one pixel or less frequently occurs. Thus, by allowing a shift by 1/N of a line, the appropriate correction can be performed. The content of the undulation is the manufacturing tolerance of the LEDA 284 and varies for each of the LEDA 284. Thus, the register value input to the undulation correction unit 214 is a value generated based on the assembly error of the light source chips measured in the fabrication step of the LEDA 284.

The LEDA control unit 215 causes the LEDA 284 to emit light based on the pixel data input from the undulation correction unit 214. The LD control unit 219 also causes the LD light source device 281 to emit light based on the pixel data input from the undulation correction unit 214. That is, the LEDA control unit 215 and the LD control unit 219 function as a light source control unit.

Outputs of the LEDA control unit 215 and the LD control unit 219 according to the present embodiment may have a high impedance and be invalidated in accordance with a register value supplied from the CPU 202 via the I/F 216. This register value is a setting value for invalidating the light source control unit to which the light source is not connected. That is, of the LEDA control unit 215 and the LD control unit 219, one to which the light source is not connected is invalidated based on the input register value. Thus, when the LEDA 284 is connected, only the LEDA 284 can be driven; when the LD light source device 281 is connected, only the LD light source device 281 can be driven.

As described above, in the present embodiment, by providing a unit, such as the skew correction unit 212, which shifts the main scanning line by one pixel and corrects the skew across the main scanning line, at a step preceding the pattern generating unit 213 in the flow of image data, it is possible to prevent the pattern generated by the pattern generating unit 213 from collapsing due to the shift of the main scanning line.

In addition, by providing the undulation correction unit 214 at a step subsequent to the pattern generating unit 213 in the flow of image data, it is possible to prevent the pattern generated by the pattern generating unit 213 from collapsing due to the assembly error of the chips of the LEDA 284. The undulation correction unit 214 divides the main scanning line into a plurality of pieces in the sub-scanning direction and makes it possible to perform shifting by 1/N of a line. Thus, the pattern generated by the pattern generating unit 213 does not greatly collapse.

Next, a description will be given of an example of the register value input from the CPU 202 via the I/F 216 for each of the cases when the LEDA 284 is connected and when the LD light source device 281 is connected. FIG. 11A is a diagram illustrating the register values when the LD light source device 281 is connected.

As illustrated in FIG. 11A, examples of the register values according to the present embodiment include a "skew correction register value" for setting an operation of the skew correction unit 212, a "pattern generation register value" for setting an operation of the pattern generating unit 213, an "undulation correction register value" for setting an operation of the undulation correction unit 214, and an "output register value" for setting operations of the LEDA control unit 215 and the LD control unit 219.

When the LD light source device 281 is connected to the optical writing control device 201, "shift position", representing the positions, in the main scanning direction, at which the skew correction unit 212 shifts the lines for reading the pixel data from the line memory 217, are enumerated in the portion headed with the "skew correction register value" as illustrated in FIG. 11A. In addition, a pattern to generate is designated as the "pattern generation register value". In the example of FIG. 11A, the "forgery prevention pattern" is designated as the "pattern generation register value".

In addition, "N" described above, that is, a "number of partitions" of one line, a "shift position" which is equivalent to the skew correction register value, and a "shift amount" corresponding to each of positions, on the main scanning line, designated as the "shift position" are set as the "undulation correction register values". In FIG. 11A, because the LD light source device 281 is connected, the undulation correction is unnecessary, and a null value is set to the "number of partitions", the "shift position", and the "shift amount". The "shift amount" denotes the amount to shift the main scanning line for reading the pixel data in the sub-scanning direction at each of a plurality of set "shift positions".

As described above with reference to FIG. 9, because the light source chips 284a, 284b, 284c, 284d, 284e, and the like in the LEDA 284 are not uniform in deviation unlike the skew illustrated in FIG. 8, it is necessary to set the "shift amount" as well as the "shift position" for the undulation correction.

As described above, the pixel data input from the pattern generating unit 213 to the undulation correction unit 214 is stored in the line memory 218 and then sequentially read by the undulation correction unit 214. However, in the case of setting as illustrated in FIG. 11A, the pixel data is input to the LEDA 284 and the LD control unit 219 in a state in which the pixel data has been input from the pattern generating unit 213 without performing the process of increasing the resolution in the sub-scanning direction by an integer multiple or the shifting processing in the sub-scanning direction corresponding to the chip error. Thus, the undulation correction unit 214 is substantively bypassed.

That is, when the LD light source device 281 is connected to the optical writing control device 201, the undulation correction unit 214 reads the pixel data once for each main scanning line of the line memory 218 based on the register value input via the I/F 216 and also reads the pixel data without performing shifting in the sub-scanning direction. As a result, even when the LD light source device 281 is connected to the optical writing control device 201, the LD light source device 281 can be appropriately driven.

In addition, of the two light source control units of the LEDA control unit 215 and the LD control unit 219, a light source control unit which is to output a signal is designated as the "output register value". In the example of FIG. 11A, because the LD light source device 281 is connected, the LD control unit 219 is designated.

Meanwhile, FIG. 11B is a diagram illustrating the register value when the LEDA 284 is connected. As illustrated in FIG. 11B, when the LEDA 284 is connected, setting items are the same as those in the example of FIG. 11A. In the "undulation correction register value", the "number of partitions", the "shift position", and the "shift amount" for correcting the assembly error of the chips of the LEDA 284 are set, respectively. Then, the LEDA 284 is designated as the "output register value". In the undulation correction register value, the values of the "shift position" and the "shift amount" are values based on data measured in the manufacturing process for each of the LEDA 284 as described above.

As described above, the light source control circuit 210 according to the present embodiment is controlled according to the register value of the CPU 202. Thus, it is not necessary to particularly provide a dedicated signal line indicating which one of the LEDA 284 and the LD light source device 281 is connected, and it is not necessary to provide a circuit for bypassing the undulation correction unit 214 according to the signal. That is, irrespective of any one of the cases when the LEDA 284 is connected and when the LD light source device 281 is connected, by setting only the same register values as in the conventional art, an appropriate operation can be performed.

Then, in the light source control circuit 210 according to the present embodiment, because a portion for executing the skew correction in common between the cases when the LEDA 284 is connected and when the LD light source device 281 is connected, the skew correction can be performed using the same line memory 217 in either case. That is, because the skew correction unit does not need to be provided preceding or subsequent to the pattern generating unit 213, the number of necessary line memories can be reduced, and thus the cost can be reduced.

For example, in order for the skew correction unit 212 to correct the skew corresponding to 10 pixels in the sub-scanning direction, the line memory 217 needs a memory amount for 10 lines. As described above, when the skew correction unit is provided preceding or subsequent to the pattern generating unit 213, a memory to afford 10 lines has to be additionally provided. In the case of four colors of CMYK (Cyan, Magenta, Yellow, and blacK), a memory amount for 40 lines has to be additionally provided. Thus, the manufacturing cost of the light source control circuit 210 can be greatly reduced by the configuration of the present embodiment. That is, according to the present embodiment, by efficiently designing the circuit of the optical writing control device 201 capable of supporting different types of light sources, the manufacturing cost can be reduced.

In the above embodiment, the LEDA 284 and the LD light source device 281 have been described as examples of the types of light sources connected to the optical writing control device 201. Furthermore, as an example, it has been described that the skew correction unit 212 for correcting the skew across the main scanning line of the LEDA 284 or the LD light source device 281 is provided at a step preceding the pattern generating unit 213, and the undulation correction unit 214 for correcting the chip assembly error of the LEDA 284 is provided at a step subsequent to the pattern generating unit 213.

However, various light sources other than the LEDA 284 or the LD light source device may be used as the light source. Whatever is used as the light source, by providing the skew correction unit 212 for correcting the skew of the electrostatic latent image formed by the light source between the main scanning line and the photosensitive element in the step preceding the pattern generating unit 213 and providing the undulation correction unit 214 for correcting the local deviation on the main scanning line in the step subsequent to the pattern generating unit 213, an effect similar to the effect described above can be obtained.

Second Embodiment

In the first embodiment, as described in FIGS. 11A and 11B, the case of setting the register setting value for each of the skew correction unit 212, the pattern generating unit 213, the undulation correction unit 214, the LEDA control unit 215, and the LD control unit 219 has been described as an example. However, the respective elements may be associated with the types of connected light sources or the patterns generated by the pattern generating unit 213. The present embodiment will be described in connection with this example. Elements having the same reference numerals as in the first embodiment denote elements which are the same as or correspond to the elements in the first embodiment, and the redundant description thereof will not be repeated.

As the pattern generated by the pattern generating unit 213, there are patterns which are used not for actual image formation output but for device adjustment such as the MUSIC pattern for color correction or the process control pattern for process control. The pattern generating unit 213 may generate a skew correction pattern, formed on the photosensitive element for calculating the register value required for the skew correction unit 212 to perform the skew correction, as the device adjustment pattern.

That is, in order for the skew correction unit 212 to perform the skew correction, it is necessary that the pattern generating unit 213 generates the skew correction pattern first, then the image formation output is performed, and the skew register value input to the skew correction unit 212 is calculated based on the result of reading the skew correction pattern through the pattern detecting sensor 117. The process of calculating the skew correction register value is performed, for example, when the image forming apparatus 1 is powered on, when the image forming apparatus 1 is returned from the standby state, or each time before image formation output is output.

However, if the skew correction is performed even when the device adjustment pattern is formed, toner and a processing time are wasted. Therefore, in general, the skew correction is controlled to be cancelled when the device adjustment pattern is formed. In this case, in the light source control circuit 210 illustrated in FIG. 10, the skew correction unit 212 reads the pixel data without shifting the main scanning line when reading the pixel data from the line memory 217.

The process of shifting the main scanning line for reading the pixel data through the skew correction unit 212 is performed based on the register value as described above. Thus, when the skew correction is to be cancelled, it is preferable to input the register value for substantively bypassing the skew correction unit 212, such as the "undulation correction register value" illustrated FIG. 11A. In the case of the first embodiment, such a register value setting is performed by the CPU 202 that performs a calculation according to a control program of the optical writing control device 201.

When the skew correction is cancelled as described above, the skew correction unit 212 according to the present embodiment does not require inputting the register value representing that shifting of the main scanning line is not performed as the register value of the "shift position" but performs the same process based on a value of a "generation pattern" of the "pattern generation register value". That is, in the light source control circuit 210 according to the present embodiment, the "pattern generation register value" is input also to the skew correction unit 212.

Then, when the "generation pattern" of the "pattern generation register value" is the device adjustment pattern such as the MUSIC pattern or the process control pattern, the skew correction unit 212 according to the present embodiment does not shift the main scanning line regardless of the input "skew correction register value" but operates so that the speed converting unit 211 and the pattern generating unit 213 can be substantively bypassed. That is, the skew correction unit 212 operates similarly to the case when the null value is set as the "shift position" of FIG. 11A.

With this function of the skew correction unit 212, in the control program for controlling the light source control circuit 210, the register value of the skew correction unit 212 for generating the device adjustment pattern does not need to be set, and thus the processing load of the CPU 202 and the memory amount consumed by the control program can be reduced.

In addition, as described above, the undulation correction unit 214 performs the undulation correction only when the LEDA 284 is connected and substantively bypasses the pattern generating unit 213 and the LD control unit 219 when the LD light source device 281 is connected. In the first embodiment, this process is controlled by setting the "undulation correction register value" as described above with reference to FIG. 11B.

On the other hand, the undulation correction unit 214 according to the present embodiment substantively bypasses the pattern generating unit 213 and the LD control unit 219 regardless of the input "undulation correction register value" as long as the "output register value" has a value representing that the LD light source device 281 is connected.

With the function of the undulation correction unit 214, similarly to the skew correction unit 212, in the control program for controlling the light source control circuit 210, the register value of the undulation correction unit 214 does not need to be set when the LD light source device 281 is connected, and thus the processing load of the CPU 202 and the memory amount consumed by the control program can be reduced.

According to the present invention, it is possible to efficiently design a circuit of an optical writing control device capable of supporting different types of light sources, whereby the manufacturing cost can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source control circuit of an optical writing device that admits connection of any one of a plurality of different types of light sources and that is configured to form an electrostatic latent image on a photosensitive element by a connected light source controlled by the light source control circuit, the light source control circuit comprising:
    a skew correction unit configured to correct a skew of a main scanning line of an electrostatic latent image formed by the light source relative to the photosensitive element by acquiring image data of an image to be formed as the electrostatic latent image;
    a pattern generating unit configured to output image data for forming a pattern in an electrostatic latent image to be formed by acquiring image data in which the skew has been corrected;
    a local deviation correction unit configured to correct a local deviation of an electrostatic latent image formed by the light source on the main scanning line by acquiring image data processed to form the pattern; and
    a light source control unit configured to cause the light source to emit light based on image data in which the local deviation has been corrected, wherein
    the skew correction unit is configured to correct the skew between the light source and the photosensitive element by storing pixel data that includes information of each of a plurality of pixels configuring the image data in a first line memory for each main scanning line, and by reading, at at least one position on the main scanning line, the pixel data after shifting a main scanning line stored in the first line memory in a sub-scanning direction,
    the pattern generating unit is configured to convert pixel data read from the first line memory into the pattern formed in the electrostatic latent image, and
    the local deviation correction unit is configured to
        store the pixel data converted by the pattern generating unit into a second line memory by each main scanning line,
        multiply resolution in the sub-scanning direction by repeating operation of reading out the converted pixel data from the second line memory,
        read out pixel data on at least one position on the main scanning line, and
        shift a main scanning line formed of the read out pixel data in the sub-scanning direction so as to correct local deviation.

2. The light source control circuit according to claim 1, wherein
    when a light source that does not need correction of the local deviation is connected, the local deviation correction unit is configured to read out pixel data once from each main scanning line in the second line memory and is configured to read out the pixel data from the second line memory without shifting the main scanning line for reading the pixel data in the sub-scanning direction.

3. The light source control circuit according to claim 1, wherein
    the light source control unit includes a configuration corresponding to each of the plurality of different types of light sources and is configured to invalidate a configuration supporting a light source other than the connected light source.

4. The light source control circuit according to claim 3, wherein
    when a configuration supporting the light source other than the connected light source is invalidated, the local deviation correction unit is configured to read the pixel data once from each main scanning direction in the second line memory and to read the pixel data from the second line memory without shifting the main scanning line for reading the pixel data in the sub-scanning direction.

5. The light source control circuit according to claim 1, wherein
    when one image is formed by transferring, in a superimposed manner, images that are formed by developing, in different colors, electrostatic latent images having been formed on a plurality of photosensitive elements,
    the pattern generating unit is configured to generate a positional deviation correction pattern for correcting deviation that occurs when the images developed on the plurality of photosensitive elements respectively are transferred in the superimposed manner, and
    the skew correction unit is configured to read the pixel data from the first line memory without shifting the main scanning line for reading the pixel data in the sub-scanning direction.

6. The light source control circuit according to claim 1, wherein
    the pattern generating unit is configured to generate a density correction pattern for correcting a density when an electrostatic latent image formed on the photosensitive element is developed, and the skew correction unit is configured to read the pixel data from the first line memory without shifting the main scanning line for reading the pixel data in the sub-scanning direction.

7. The light source control circuit according to claim 1, wherein
both a light emitting diode (LED) light source and a laser diode (LD) light source are connectable thereto, and
the local deviation correction unit is configured to correct an assembly error of an LED chip in the LED light source.

8. An image forming apparatus comprising:
an optical writing device controlled by the light source control circuit according to claim 1.

9. A light source control method for controlling a light source in an optical writing device that admits connection of any one of a plurality of different types of light sources and that is configured to form an electrostatic latent image on a photosensitive element by a connected light source, the light source control method comprising:
correcting a skew between the light source and the photosensitive element by storing pixel data that includes information of each of a plurality of pixels configuring image data of an image to be formed as the electrostatic latent image in a first line memory for each main scanning line, shifting a main scanning line of the first line memory in a sub-scanning direction at a position, on the main scanning line, and reading the pixel data at at least one position on the main scanning line;
converting pixel data read from the first line memory into a predetermined pattern formed in the electrostatic latent image;
correcting a local deviation by storing the converted pixel data in a second line memory for each main scanning line, multiplying resolution multiple times in the sub-scanning direction by repeating operation of reading out the converted pixel data from the second line memory, reading out pixel data on at least one position on the main scanning line, and shifting a main scanning line formed of the read out pixel data in the sub-scanning direction so as to correct the local deviation; and
causing the light source to emit light based on the pixel data read from the second line memory.

* * * * *